Sept. 12, 1950  G. E. DATH ET AL  2,521,834
FRICTION SHOCK ABSORBING MECHANISM
Filed Dec. 26, 1946  2 Sheets-Sheet 1
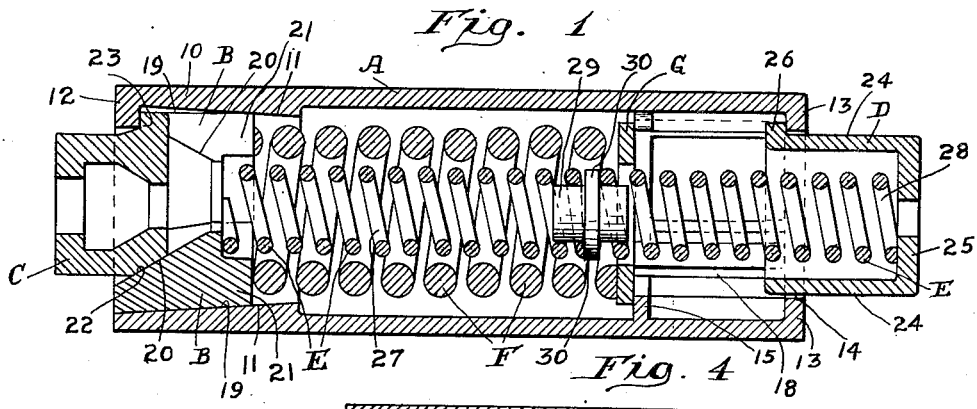
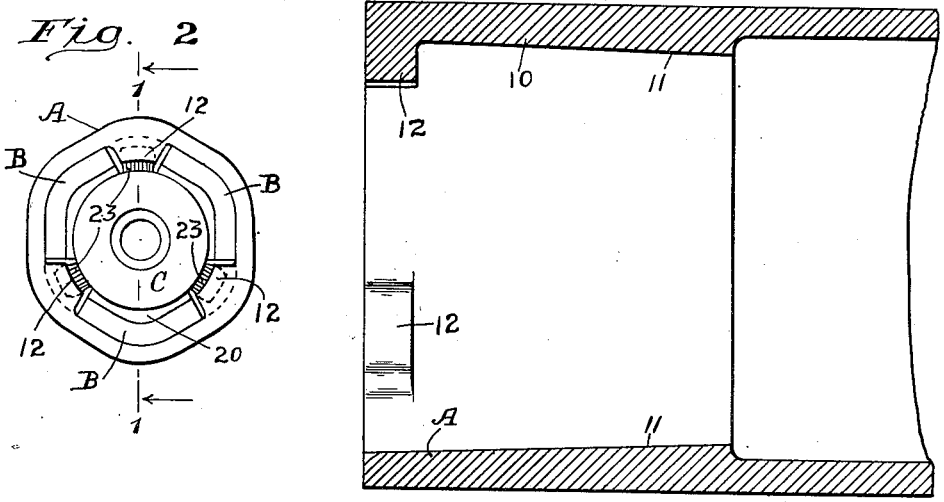
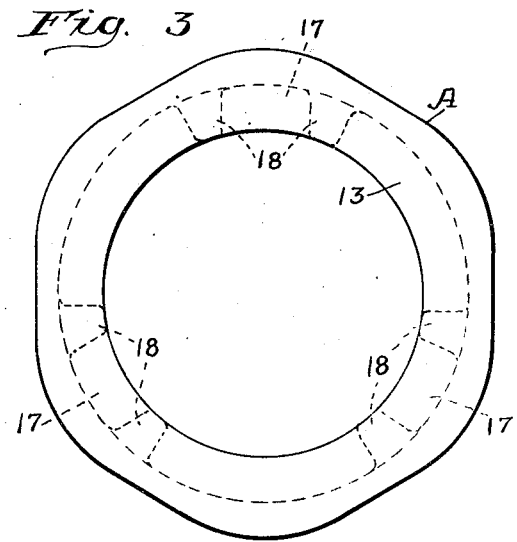
Inventors
George E. Dath.
Carl A. Anderson.
By Henry Fuchs. Atty.

Sept. 12, 1950 G. E. DATH ET AL 2,521,834
FRICTION SHOCK ABSORBING MECHANISM
Filed Dec. 26, 1946 2 Sheets-Sheet 2
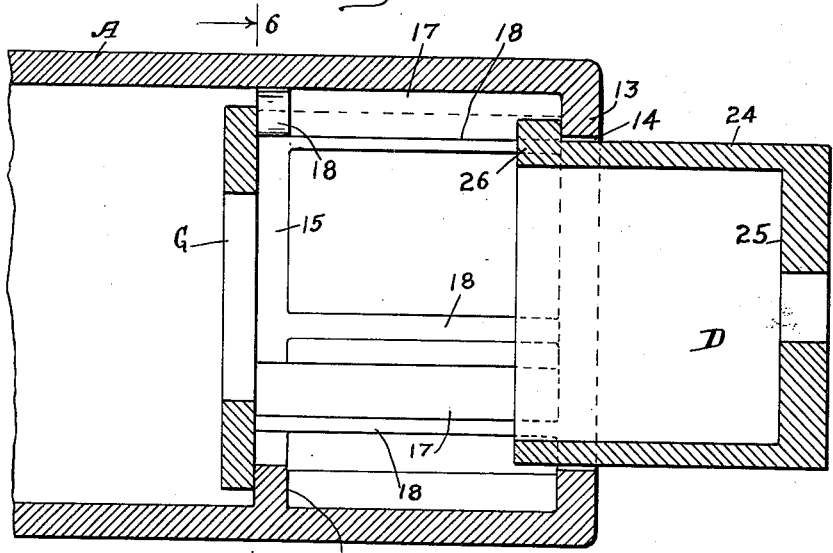
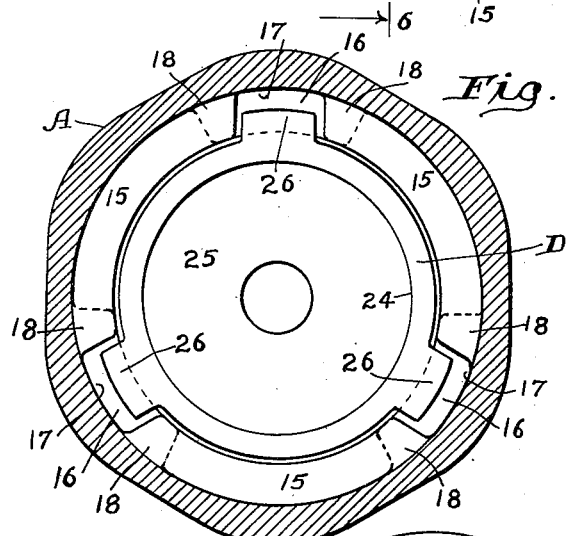
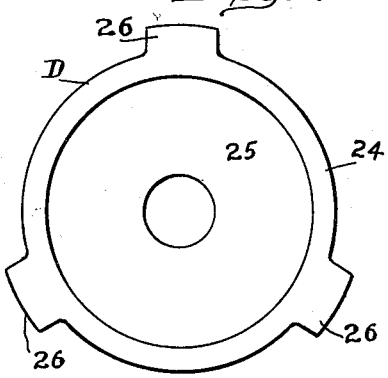
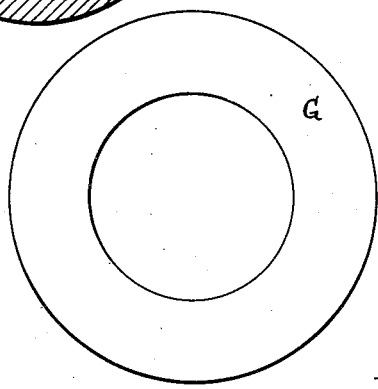
Inventors:
George E. Dath.
Carl A. Anderson.
By Henry Fuchs, Atty.

Patented Sept. 12, 1950

2,521,834

UNITED STATES PATENT OFFICE 2,521,834

FRICTION SHOCK ABSORBING MECHANISM

George E. Dath, Mokena, and Carl A. Anderson, Chicago, Ill., assignors to W. H. Miner, Inc., Chicago, Ill., a corporation of Delaware Application December 26, 1946, Serial No. 718,330

5 Claims. (Cl. 213—24)

This invention relates to improvements in friction shock absorbing mechanisms, and more particularly to mechanisms of this character employed in the buffing means of railway cars.

An object of the invention is to provide a friction shock absorber for buffing mechanisms of railway cars, having preliminary spring action to absorb the lighter shocks followed by relatively high frictional resistance to absorb heavier shocks, and comprising a friction casing, a friction clutch telescoped within one end of the casing, a spring cap telescoped within the other end of the casing, and spring means within the casing yieldingly opposing inward movement of the spring cap and friction clutch to provide respectively the preliminary spring action and the high frictional resistance, wherein the casing is provided with stop means for limiting outward movement of the friction clutch and spring cap and holding the parts assembled, the arrangement and design of the casing and the parts contained therein being such that the latter may be all entered through the same end of the casing in assembling these parts with the casing.

A further object of the invention is to provide a mechanism as set forth in the preceding paragraph wherein the parts contained within the casing are all assembled therewith by being entered through the friction clutch end of the mechanism and wherein the stop means for limiting outward movement of the spring cap is in the form of a continuous inturned flange at the spring cap end of the casing, with which the stop lugs of the cap engage, and the stop means for limiting outward movement of the friction clutch is in the form of circumferentially spaced, internal stop lugs at the friction clutch end of the casing with which the stop lugs on one of the members of the clutch engage, the stop lugs on the spring cap and the stop lugs of the friction clutch being designed so that the same will clear each other in entering the spring cap through the friction clutch end of the casing.

A still further object of the invention is to provide a friction shock absorbing mechanism, as hereinbefore set forth, wherein the spring resistance comprises a pair of springs, one of which reacts between the friction clutch and the casing and the other of which reacts between the spring cap and the friction clutch to oppose inward movement of the cap during the first part of the compression of the mechanism to afford the preliminary spring action.

A more specific object of the invention is to provide a friction shock absorbing mechanism including a friction casing, a spring cap slidable in one end of the casing, a friction clutch comprising friction shoes and a wedge member slidable within the other end of the casing, a relatively heavy spring reacting between the clutch and abutment means on the casing to oppose inward movement of the clutch, a relatively lighter spring reacting between the clutch and the spring cap to oppose relative approach of the spring cap and clutch, cooperating stop means on the casing and wedge member for limiting outward movement of the latter, and cooperating stop means on the casing and spring cap for limiting outward movement of the cap, wherein the abutment means on the casing with which the heavy spring reacts is in the form of interior projections on the casing and a stop ring on which the spring bears having shouldered engagement with said projections, the coacting stop means one the casing and wedge is in the form of interengaging cooperating stop lugs, and the stop means on the spring cap and casing comprises an interior, annular flange at the spring cap end of the casing and stop lugs on the cap, wherein the stop lugs on the cap are designed to clear the stop lugs on the casing when the cap is given a partial turn to stagger the lugs thereof with respect to the lugs of the casing, thereby permitting insertion of the cap into the casing through the friction clutch end thereof, and wherein the stop projections on the casing are circumferentially spaced to permit passage therebetween of the lugs of the spring cap in bringing the cap to cooperative position with respect to the annular flange of the casing which limits outward movement of the cap.

Other objects of the invention will more clearly appear from the description and claims hereinafter following.

In the accompanying drawings forming a part of this specification, Figure 1 is a longitudinal, vertical sectional view of our improved friction shock absorbing mechanism, said sectional view corresponding substantially to the line 1—1 of Figure 2. Figure 2 is a front end elevational view of Figure 1, looking from left to right in said figure. Figure 3 is a rear end elevational view, on an enlarged scale, of the casing shown in Figure 1, looking from right to left in said figure. Figure 4 is a view, similar to Figure 1, on an enlarged scale, of the front end portion of the friction casing only of the mechanism. Figure 5 is a view, similar to Figure 1, on an enlarged scale, of the rear end portion of the mechanism shown in Figure 1, with the springs omitted. Figure 6 is a transverse, vertical sectional view, corresponding substantially to the line 6—6 of Figure 5. Figure 7 is an elevational view of the preliminary spring cap of our improved mechanism, looking from left to right in Figure 5. Figure 8 is a plan view of the stop washer looking from right to left in Figure 5.

As shown in the drawings, our improved friction shock absorbing mechanism comprises broadly a friction casing A, three friction shoes B—B—B, a central wedge block C, a preliminary spring cap D, an inner spring E, an outer spring F, and a stop washer G.

The friction casing A is in the form of an elongated tubular casting of substantially hexagonal, exterior cross section throughout its length, open at its front and rear ends. At the front or left hand end of the casing, the walls thereof are inwardly thickened and define a friction shell section 10 which is of hexagonal interior cross section. The friction shell section presents three rearwardly converging, interior friction surfaces 11—11—11 of V-shaped, transverse section, each surface being formed by two adjacent walls of the hexagonal friction shell portion of the casing A. Rearwardly of the friction shell section 10, the casing A is of substantially cylindrical, interior cross section. At the front or left hand end, the casing A has three laterally inwardly extending stop lugs 12—12—12, which are equally spaced circumferentially of the casing. The rear or right hand end of the casing, as seen in Figures 1 and 5, is provided with an inturned, annular stop flange 13. The stop flange 13 serves as an abutment for limiting outward movement of the preliminary spring cap D, which is accommodated for sliding movement in the circular opening 14 defined by the flange 13.

The casing A is further provided with an interior abutment flange 15, spaced forwardly from the rear end of the casing and projecting from the side wall thereof. The flange 15 is notched or cut out at three circumferentially spaced points, thus providing openings 16—16—16 therethrough. Three lengthwise extending, interior guideways 17—17—17 are formed at the rear end portion of the casing, which guideways register respectively with the openings 16—16—16 of the flange 15, each guideway being formed by a pair of longitudinal ribs 18—18 projecting from the side wall of the casing and extending from the flange 15 to the flange 13. The openings 16—16—16 of the flange 15 form continuations of the guideways 17—17—17, and the guideways and the openings 16, as shown in the drawings, are in longitudinal alignment with the stop lugs 12—12—12 at the front end of the casing. Although these guideways are shown as in alignment with the stop lugs 12—12—12, it will be evident that the same may be differently disposed and be placed so as to align with the openings between these stop lugs.

The friction shoes B are three in number and cooperate with the three interior friction surfaces 11 of the casing. Each shoe B has a friction surface 19 on the outer side which is of V-shaped, transverse cross section and is slidably engaged with the corresponding V-shaped friction surface 11 of the casing. On the inner side, each shoe has a lateral inward enlargement provided with a wedge face 20 of V-shaped, transverse section. The V-shaped surfaces 20—20—20 of the three shoes converge rearwardly of the mechanism. The enlargement of each shoe provides a transverse, rear abutment face or shoulder 21, offset forwardly from the rear end of the shoe and on which the front end of the inner spring E bears.

The wedge block C is centrally disposed between the shoes and has three wedge faces 22—22—22 at its inner end of V-shaped, transverse section, correspondingly inclined to and engaging with the wedge faces 20—20—20 of the shoes B—B—B. At the inner end thereof, the wedge block C has three radially projecting stop flanges or lugs 23—23—23, which extend between adjacent shoes and engage in back of the stop lugs 12—12—12 of the casing to restrict outward movement of the wedge block. The block C normally projects outwardly of the casing and is adapted to receive the actuating forces.

The spring cap D is in the form of a cup-shaped member having a cylindrical side wall 24 and a vertical outer end wall 25. The cap D is slidingly telescoped within the rear end of the casing and has three radially outwardly projecting lugs 26—26—26 at its inner end extending into the guideways 17—17—17 and adapted to shoulder against the annular stop flange 13 of the casing to limit outward movement of the cap.

The springs E and F are arranged lengthwise within the casing A. The spring E, which is disposed within the spring F, is preferably composed of two parts, a relatively long front spring coil 27 and a shorter rear coil 28 having a pressure transmitting follower plunger 29 interposed therebetween, the plunger being in the form of a cylindrical plug having a peripheral flange 30 midway between its ends, bearing on the rear end of the front coil 27 and the front end of the rear coil 28 of the spring E with the projecting cylindrical ends of the plug engaged respectively in said front and rear coils. The front end of the spring E extends into the space between the friction shoes B—B—B and bears on the shoulders 21—21—21 of said shoes. The rear end of this spring extends into the preliminary spring cap D and bears on the end wall 25 of said cap. The spring F, which is heavier than the spring E, surrounds the latter and has its front end bearing on the inner ends of the shoes B—B—B.

The stop washer G, which is in the form of a ring surrounding the inner spring E, is interposed between the rear end of the spring F and the abutment flange 15 of the casing A, and, together with said flange 15, serves as a rear abutment for the spring F. In the assembled condition of the mechanism, the springs E and F are preferably under a predetermined amount of initial compression.

In assembling the parts contained within the casing A with the casing, these parts are all inserted through the open front end of the same, the spring cap D being the first part applied. In assembling the mechanism, the casing A is placed in upright position, being stood on its rear end. In applying the spring cap, the same is passed into the front end of the casing with the lugs 26—26—26 thereof staggered circumferentially with respect to the lugs 12—12—12 of the casing so as to pass through the openings between the last named lugs. After the cap has been pushed into the casing a sufficient distance to clear the lugs of the latter, it is given a partial turn to align the lugs 26—26—26 with the guideways 17—17—17 and the openings 16—16—16 of the flange 15, which openings lead to the guideways. The cap is then pushed rearwardly to the position shown in Figure 1, and the lugs 26—26—26 engaged in the guideways 17—17—17. The stop washer G is next placed in position against the flange 15 of the casing. The springs E and F are then inserted and the shoes B—B—B placed in position on top of the springs. After the shoes have been thus positioned, the same are forced inwardly by any suitable tool to a sufficient extent to provide clearance for the lugs 23—23—23 of the wedge block C to pass edgewise between the front ends of the shoes B—B—B and the rear sides of the lugs 12—12—12 of the casing. While the shoes are held in this position, the wedge C is applied by inserting the same into the open front end of the casing with the lugs 23—23—23 thereof staggered circumferentially with respect to the lugs 12—12—12 so as to pass through the spaces between the latter. After the wedge has been passed inwardly of the casing to a sufficient extent to dispose the lugs thereof rearwardly of the lugs 12 of the casing, the wedge is given a partial turn to align the lugs thereof with the lugs 12. The holding tool is then withdrawn, permitting the springs E and F to project the shoes outwardly against the wedge block, thus forcing the lugs 23—23—23 against the lugs 12—12—12 and with the lugs 23—23—23 extended between adjacent shoes. As will be evident, the V-shaped arrangement of the interengaging friction surfaces of the shoes and casing prevents rotation of the shoes with respect to the casing, and the wedge block, in turn, is locked against rotation with respect to the shoes by the lugs 23 of the wedge block, which extend between adjacent shoes, thus maintaining the lugs of the wedge block aligned with the lugs of the casing and preventing accidental disengagement of the wedge from the casing.

In the operation of our improved shock absorbing mechanism, when employed as a buffer for cars, the same is compressed between the usual fixed abutment of the buffer mechanism and the movable buffer stem. As the mechanism is thus being compressed, the spring cap D first moves inwardly of the casing A, against the resistance of the inner spring E, thereby providing light preliminary action, the static friction between the friction shoes B—B—B and the casing A being sufficient to hold the wedge C and the shoes B—B—B against movement inwardly of the casing. After the cap has been moved inwardly to its full extent, the member of the buffing mechanism, which is in engagement with the cap, comes into engagement with the corresponding end of the casing and the wedge member C is forced to move inwardly of the casing during the remainder of the compression stroke, thereby producing high frictional resistance by wedging the shoes apart and forcing the same inwardly of the casing against the combined resistance of the springs E and F.

We claim:

1. In a friction shock absorbing mechanism, the combination with a friction casing having interior friction surfaces at one end; of a spring cap slidingly telescoped within the other end of the casing, said casing having an interior abutment flange spaced inwardly from the spring cap end thereof, said spring cap and casing having cooperating abutment shoulders, said abutment flange having openings therethrough through which the shoulders of the spring cap are adapted to pass; a friction clutch slidingly telescoped within the first named end of the casing; and spring means within the casing yieldingly opposing inward movement of said cap and friction clutch, said spring means including a spring element bearing at one end on said clutch and having its other end buttressed against said abutment flange.

2. In a friction shock absorbing mechanism, the combination with a friction casing having interior friction surfaces at one end, said casing having circumferentially spaced, inturned stop lugs at said end of the casing, and an inturned stop flange at the other end thereof; of a spring cap telescoped within said second named end of the casing; radial lugs on said cap engaging said stop flange to limit outward movement of the cap, said cap being insertable through the first named end of the casing in assembling the mechanism, turned to a position to stagger the stop lugs thereof with the stop lugs of the casing; friction shoes slidingly engaged with the friction surfaces of the casing; a wedge block having wedging engagement with the shoes; radial lugs on said wedge block engageable in back of the inturned stop lugs of the casing to limit outward movement of said block; and spring means within the casing yieldingly opposing inward movement of the spring cap and shoes.

3. In a friction shock absorbing mechanism, the combination with a friction casing having interior friction surfaces at one end and circumferentially spaced, inturned stop lugs at said end; of a friction clutch slidingly telescoped within said end of the casing, said clutch including a wedge block having lugs adapted to engage said stop lugs to anchor the wedge block to the casing; an inwardly extending, annular stop flange at the other end of the casing; a spring cap telescoped within said second named end of the casing; radial outwardly projecting lugs on said spring cap engageable with the stop flange to limit outward movement of the cap, said cap being insertable through the first named end of the casing when turned to a position to align the lugs thereof with the spaces between the lugs at said first named end of the casing; an internal, annular abutment flange on the casing spaced inwardly from said stop flange, said abutment flange being notched to provide passageways for the lugs of said cap; a spring within the casing yieldingly opposing inward movement of the cap and friction clutch; and a spring surrounding said first named spring and bearing at one end on said clutch, said spring having its other end buttressed against said annular abutment flange.

4. In a friction shock absorbing mechanism, the combination with a friction casing having interior friction surfaces at one end and circumferentially spaced, inturned stop lugs at said end; of a friction clutch slidingly telescoped within said end of the casing, said clutch including a wedge block having lugs adapted to engage said stop lugs to anchor the wedge block to the casing; an inwardly extending, annular stop flange at the other end of the casing; a spring cap telescoped within said second named end of the casing; radial outwardly projecting lugs on said spring cap engageable with the stop flange to limit outward movement of the cap, said cap being insertable through the first named end of the casing when turned to a position to align the lugs thereof with the spaces between the lugs at said first named end of the casing; an internal, annular abutment flange on the casing spaced inwardly from said stop flange, said abutment flange being notched to provide passageways for the lugs of said cap; a spring within the casing yieldingly opposing inward movement of the cap and friction clutch; a spring surrounding said first named spring and bearing at one end on said clutch; and a washer surrounding said first named spring, said washer being interposed between said annular abutment flange and the other end of said second named spring.

5. In a friction shock absorbing mechanism, the combination with a friction casing having interior friction surfaces at one end and circumferentially spaced, inturned stop lugs at said end; of a friction clutch slidingly telescoped within said end of the casing, said clutch including a wedge block having lugs adapted to engage said stop lugs to anchor the wedge block to the casing; an inwardly extending, annular stop flange at the other end of the casing; a spring cap telescoped within said second named end of the casing; radial outwardly projecting lugs on said spring cap engageable with the stop flange to limit outward movement of the cap, said cap being insertable through the first named end of the casing when turned to a position to align the lugs thereof with the spaces between the lugs at said first named end of the casing; an internal, annular abutment flange on the casing spaced inwardly from said stop flange, said abutment flange being notched to provide passageways for the lugs of said cap; longitudinal guideways on the interior of said casing extending from said abutment flange to said stop flange, said guideways being in alignment with the notches of said abutment flange and accommodating the lugs of the cap for sliding movement; a spring within the casing yieldingly opposing inward movement of the cap and friction clutch; and a spring surrounding said first named spring and bearing at one end on said clutch, said spring having its other end buttressed against said annular abutment flange.

GEORGE E. DATH.
CARL A. ANDERSON.

REFERENCES CITED

The following references are of record in the file of this patent:

UNITED STATES PATENTS

| Number | Name | Date |
|--------|------|------|
| 2,076,769 | Dentler | Apr. 13, 1937 |